United States Patent
King

[15] 3,705,628
[45] Dec. 12, 1972

[54] SOD CULTIVATOR
[72] Inventor: William M. King, R.R. No. 2, Lewisburg, W. Va. 24901
[22] Filed: Oct. 30, 1970
[21] Appl. No.: 86,152

[52] U.S. Cl. .................... 172/68, 172/123, 172/413, 172/548
[51] Int. Cl. ............................................. A01b 9/00
[58] Field of Search.......... 172/43, 49, 51, 55, 35, 48, 172/61, 65, 68, 69, 78, 118, 123, 316, 407, 413, 540, 545, 546, 548; 29/125

[56] References Cited

UNITED STATES PATENTS

| | | | |
|---|---|---|---|
| 2,229,497 | 1/1941 | Dontje | 172/43 |
| 2,738,717 | 3/1956 | Hintz et al. | 172/49 X |
| 3,239,015 | 3/1966 | Scott | 172/413 |
| 3,006,422 | 10/1961 | Mighell | 172/413 X |
| 3,327,143 | 6/1967 | Rosenthal | 29/125 UX |
| 1,280,231 | 10/1918 | Johnson | 172/69 X |
| 3,194,194 | 7/1965 | Phelps | 172/69 X |
| 2,787,943 | 4/1957 | Browning | 172/78 X |
| 2,455,148 | 11/1948 | Traver | 172/68 |
| 3,173,493 | 3/1965 | Renault | 172/69 |
| 1,509,652 | 9/1924 | Johnson | 172/68 X |

Primary Examiner—Robert E. Pulfrey
Assistant Examiner—R. T. Rader
Attorney—Clarence A. O'Brien and Harvey B. Jacobson

[57] ABSTRACT

An implement includes a shaft mounting alternatingly positioned members of two distinct types. The first type is a spur disc that digs a narrow seed bed track as the implement is drawn along sod. Each disc is bounded on both sides thereof by members of a second type characterized as roller means. The roller means push down on the sod while the track is being formed so that the lateral boundaries of the track are not disturbed.

5 Claims, 8 Drawing Figures

PATENTED DEC 12 1972

William M. King
INVENTOR.

BY *Clarence A. O'Brien*
*and Harvey B. Jacobson*
Attorneys

William M. King
INVENTOR.

3,705,628

SOD CULTIVATOR

BACKGROUND OF THE INVENTION

The present invention relates to farming implements and more particularly to an implement adapted to dig narrow seed bed tracks in sod.

Due to agricultural conditions in certain types of farmland, there is a need for a machine that is capable of operating in tough, thick sod and which will dig and thin as well as cultivate and aerate a thin sod track so as to leave a stand of grass and sufficiently loose soil for a good seed bed. From a practical point of view, a machine capable of meeting these requirements must be heavy enough to penetrate dry, unplowed soil and with teeth structurally sufficient to chip rock. During the present time, machines capable of effectively cultivating sod in this environment are not available.

Meadows and pasture land that are well fertilized usually thrive and yield abundantly, weather and precipitation being favorable. However, after a few seasons, the legumes that furnish desired protein in hay and silage become crowded out and smothered by the luxuriantly growing grasses. Thus, a need arises for reconditioning or developing a new stand.

One solution to this problem is for the farmer to plow the sod. However, this solution is inadequate inasmuch as plowing has a tendency to accelerate the effect of erosion, particularly on rolling and sloping fields.

Other options are available to the farmer such as disking and tilling. However, when the farmer attempts to disk, the sod is cut into ribbons that will dry out and will roll around to the point where the ribbons are incapable of being pulverized. By using a conventional tiller, sod comes off in patches periodically along with the roots, rocks and other trash. The end result is the generation of ungainly piles that makes harvesting difficult. If instead, a drag harrow is used, the end result is that the harrow scratches the sod superficially and soon becomes clogged with residue thereby terminating the implement's usefulness.

SUMMARY OF THE INVENTION

From the aforementioned discussion, it becomes quite evident that what is needed is a machine that is capable of heavy duty in that the machine must penetrate the ground and must be durable enough to stand the stresses and strains it will be subjected to. The present invention fits the bill. By means of a special construction, the invention can cut and thin the stand, clean itself, and leave a level mulch with loose soil for a good seed bed.

Basically, the present invention consists of rotary members positioned in alternating sequence on a driven shaft. Every other rotary member slips along the ground while spurs formed along the periphery of the rotary member cut through the sod thereby forming a seed bed track. Adjacent each slipping rotary member is a roller member that is freely mounted on the shaft so that it rolls along the sod as the implement is pulled. As a result, the roller member keeps the sod in place while the adjacent spurred rotary member cuts the seed bed track. While using the present invention, the rotary members on the shaft wipe themselves clean of soil and roots as they leave the sod. The sod itself is torn and mixed with loose soil which is evenly packed down by the roller members.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
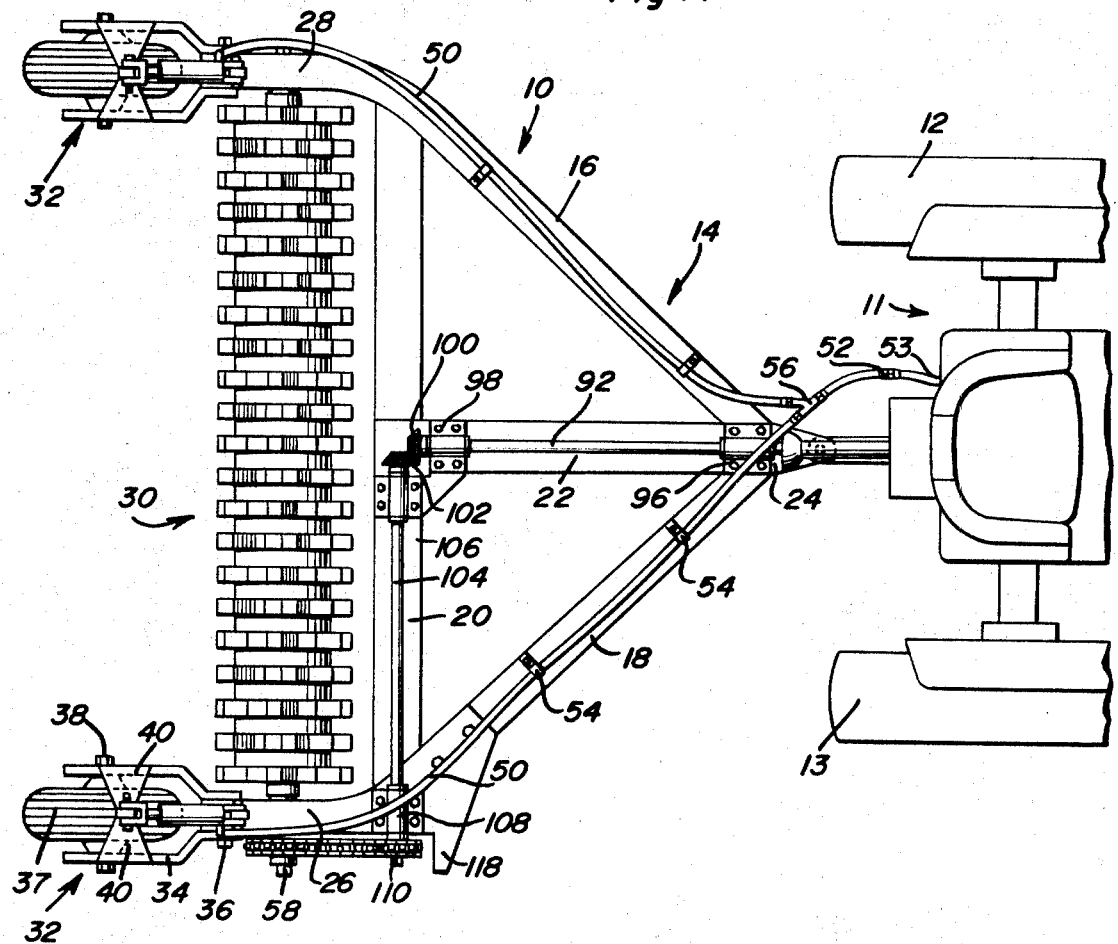
FIG. 1 is a top plan view illustrating the appearance of the present implement.
Figure 2:
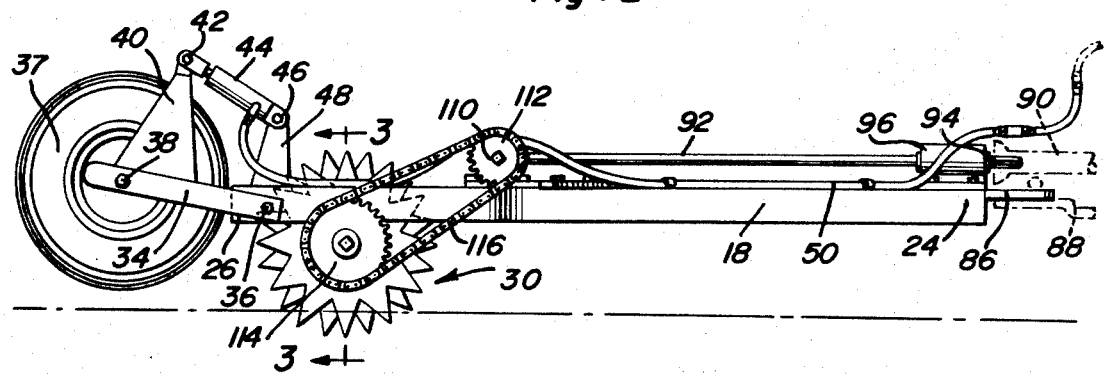
FIG. 2 is a side elevational view of the implement shown in FIG. 1.

Referring to the drawings and more particularly FIGS. 1 and 2, reference numeral 10 generally indicates the implement that forms the present invention. The implement is to be drawn by a draft vehicle such as a tractor 11 having rear drive wheels 12 and 13.

The implement includes a frame that is generally triangular in shape, the frame being indicated by reference numeral 14. In cross-section, the frame members are channel irons. From an apex point 24 that is directly behind the power take-off of the tractor 11 are two arms 16 and 18 of a symmetrical triangle. The triangle base 20 consists of a single channel member which extends between the arms 16 and 18. The frame member 20 is suitably secured to the arms 16 and 18 by means of welding or the like. A median member 22 extends from the frame apex 24 to an oppositely disposed, central point on the frame member 20. As clearly indicated in FIG. 1, the rearward ends of arms 16 and 18 wrap around to form frame portions 26 and 28 that extend in rearward parallel relation to the tractor wheels 12 and 13.

An earth working assembly with a plurality of shaft mounted rotary means is positioned between the wraparound frame portions 26 and 28. This assembly is generally indicated by reference numeral 30 and is discussed at length hereinafter.

Two spaced and aligned wheel assemblies 32 are connected to the outward ends of the frame portions 26 and 28. As will become evident by viewing FIG. 2, the purpose of the wheels is to effect engagement between the rotary means of assembly 30 with the ground when the earth is to be worked. However, when non-operational transport of the implement is desired, the wheel assemblies are driven downwardly so as to cause the rear end of the frame to be lifted from the ground thereby freeing engagement between the rotary means and the ground. When the wheels touch down, the tractor 11 may be driven at a faster speed.

FIGS. 1 and 2 show the detail for each wheel assembly 32. Each wheel includes a clevis 34 that is pivotally mounted at 36 to the rear end of an associated frame portion (26, 28). A wheel member 37 is mounted by the clevis 34 and secured in position by an axle 38 that extends between the legs of the clevis. Two triangular plates 40 extend convergingly upwards from the upper edges of the clevis legs. At the point of convergence is a pivotal connection 42 for the clevised piston end of a hydraulic cylinder 44. The opposite end 46 of the cylinder 44 is likewise clevised and is pivotally connected to a vertically extending plate 48 that is attached at a lower end thereof to the upper surface of the rear frame portion (26, 28). A fluid line 50 is connected at one end thereof to the cylinder 44 while the intermediate length of the line 50 is supported along the upper surface of an associated frame section. Clamp members 54 are secured at regular intervals along the upper surface of the frame, the clamp members serving to secure line 50 to the frame. As clearly indicated in FIG. 1, separate fluid lines are connected to each of the wheel assemblies 32. A T-connector 56 is employed to connect the lines 50 to a single branch 52 that is coupled to the tractor hydraulic terminal 53 so that both wheel assemblies 32 will be raised and lowered simultaneously.

In operation of the wheel assemblies, when positive pressure is supplied in lines 50, the cylinder 44 expands thereby causing outward movement of the cylinder piston which in turn causes rearward displacement of the clevised piston end 42. As a result, the wheel assembly clevis 34 is forced downwardly until contact is made between wheel member 37 and the ground. As the piston is caused to expand further, the rear end of the frame is raised thereby freeing contact between the rotary means 30 and the ground. A suitable pivotal hitch must be provided between the implement and the tractor to accommodate the elevation of the frame rear end.

Figure 3:
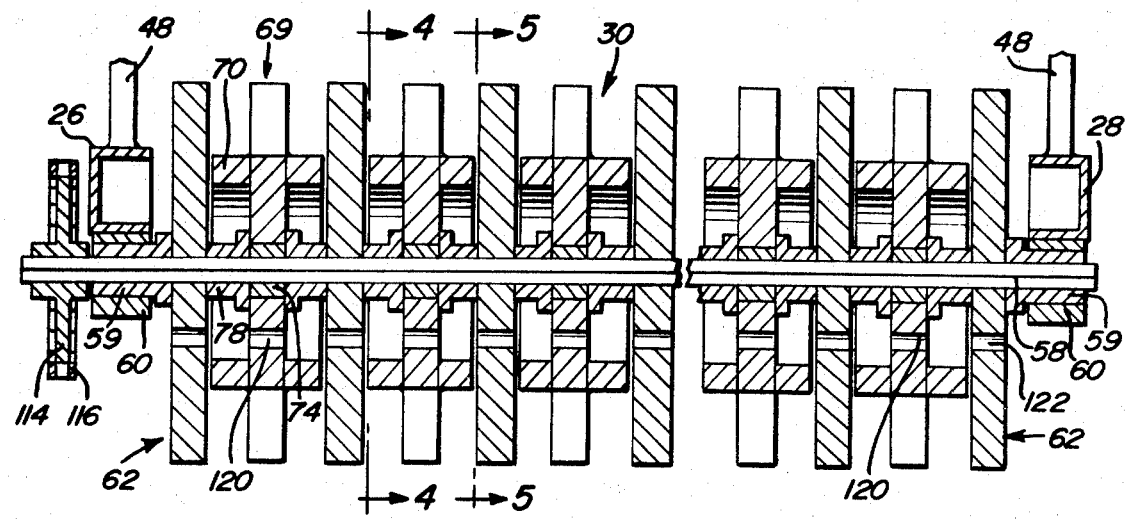
FIG. 3 is a transverse sectional view taken along a plane passing through section line 3—3 of FIG. 2.

Referring to FIG. 3, the earth working assembly 30 is seen to include a shaft 58 having a guadrilateral cross-section. The opposite ends of shaft 58 are received in end bearings 59 that are themselves received in end journals 60. The journals 60 are suitably secured to the lower edge of the frame portions 26 and 28. As indicated in FIG. 3, the rotary members in the assembly 30 include an alternating series of spur disks 62 and roller members 69. The rotary members at both ends of shaft 58 are spur disks 62.

Figure 5:
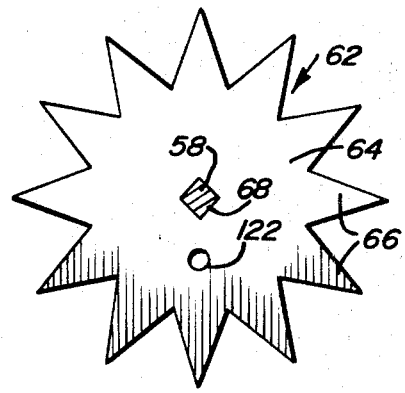
FIG. 5 is a sectional view taken along a plane passing through section line 5—5 of FIG. 3 illustrating a spur disk which is employed to form a seed bed track.

Referring to FIG. 5, the spur disk 62 is seen to include a central flat body 64 having triangular spur projections 66 extending around the periphery. A quadrilateral shaped opening 68 is formed at the center of the disk body to allow keying passage of shaft 58 therethrough.

Figure 4:
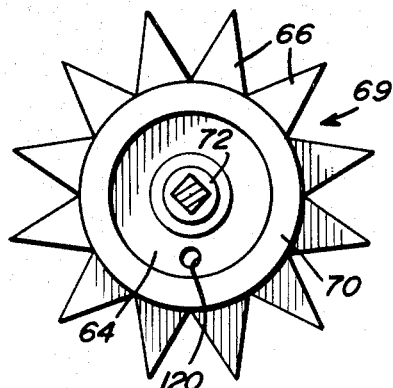
FIG. 4 is a transverse sectional view taken along a plane passing through section line 4—4 of FIG. 3 which illustrates a first earth working member that serves as a roller.

In FIG. 4, the roller member 69 is seen to include a spur disk identical with disk 62 shown in FIG. 5. However, annular rings 70 are concentrically mounted on opposite sides of the disk body by means of welding or the like.

The inclusion of the annular ring members 70 give the rotary member 69 the effect of a roller. The operation of rotary members 62 and 69 is explained in greater detail hereinafter.

Figures 7, 8:
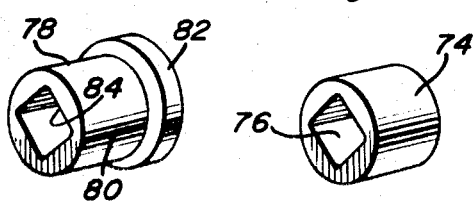
FIG. 7 is a perspective view illustrating a spacer employed between rotary members in the implement.
FIG. 8 is a perspective view depicting a bearing for the rotary member illustrated in FIG. 4.

Viewing FIGS. 3 and 4, it will be noted that a central opening 72 is formed in the disk body 64. This opening allows insertion of a cylindrical bearing 74 (FIG. 8) having a central bore 76 of quadrilateral cross-section. The cylindrical member 74 is adapted to key with the shaft 58 while pure rolling can be realized between the annular member 69 and the outer wall surface of the bearing 74. In order to maintain spaced relation between the spur disks 62 and the roller members 69, headed cylindrical spacers 78 are keyed to shaft 58 due to the quadrilateral bore 84 formed in the spacer members 78. The cylindrical body 80 of the spacer resides in concentric aligned relation with the wall of the annular ring 70 while an enlarged head portion 82 of the spacer 78 abuts a corresponding surface on the disk body of the roller member 69. As will be observed by careful examination of FIG. 3, the outward free end of the spacer 78 abuts a confronting side surface of a spur disk 62, the spacer having a length sufficient to maintain a slight gap between confronting edges of spur disk 62 and an adjacent annular member 70.

Driving means, to be discussed hereinafter, drive shaft 58 at a preselected speed. Inasmuch as roller member 69 is freely mounted on shaft 58, the rotation of the shaft does not affect this member. Rather, the roller member 69 will roll along the ground as a normal wheel would. However, the plain spur disks 62 are keyed to the shaft 58. The speed of shaft rotation is designed so that the spur disk 62 slips along the ground with partial drag. As a result, the spurs 66 on the spur disk will cut through the sod and form a narrow track in the ground which serves as a seed bed.

The spurs 66 on the roller member 69 will also pierce the sod. However, inasmuch as this member rolls along the ground, no real digging occurs along the path traversed by each roller member 69. Rather, as the spurs pierce the sod, the outer surface of the annular ring members 70 engage the sod and hold the sod down while an adjacent spur disk 62 generates a seed bed track. This novel combination of alternating roller members and digging spur disks performs in a superior manner inasmuch as this combination prevents the sod from moving in a mass like a carpet.

Referring to FIG. 2, the forwardly disposed apex point 24 of the frame mounts a tow bar 86 that is pivotally connected with a mating tow bar 88 attached to the tractor. Thus, as the tractor moves forward, the implement is pulled forward.

As will be seen in FIG. 2 of the drawings, the independent power take-off 90 of tractor 11 is connected to a splined end 94 of a first drive shaft 92 that centrally overlies the median frame section 22. Viewing FIG. 2, the opposite end of the drive shaft 92 terminates over the base frame member 20 and a first bevel gear 100 is connected to this end of the drive shaft 92. Journals 96 and 98 suitably support the right and left end of the drive shaft 92. A second right angled beveled gear 102 meshes with the gear 100, the beveled gear 102 being connected to a second drive shaft 104 that extends perpendicularly to the first drive shaft 92. The second drive shaft 104 is located above the base 20 of the frame. A journal 106 suitably supports the end of the drive shaft 104 adjacent the bevel gear 102. The opposite end of the drive shaft 104 terminates in a second journal 108 that is secured to the frame at a point between triangular leg 18 and the wrap-around portion 26. The outward free end of drive shaft 104 has a splined end which is keyed to a sprocket wheel 112. A second larger sprocket wheel 114 is suitably keyed to the outward end of shaft 58. This is more clearly shown in FIG. 3. Due to the larger diameter of the second sprocket wheel 114, speed reduction from sprocket wheel 112 to 114 is effected. Motion is transmitted from the driving sprocket wheel 112 to the driven sprocket wheel 114 by a chain belt 116.

In order to protect the sprocket wheels and chain from damage, a wing guard 118 (FIG. 1) extends outwardly from the triangular leg 18 of the frame, the guard being positioned just forwardly of the sprocket wheel 112.

Figure 6:
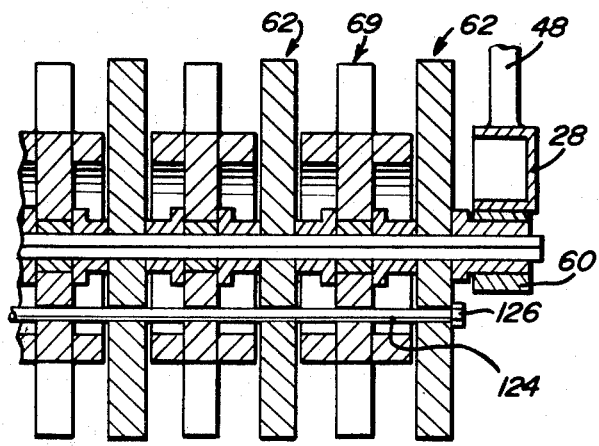
FIG. 6 is a partial sectional view illustrating the insertion of a connecting rod into all rotary earth working members in the implement to cause linked simultaneous rotation of these members at the same speed.

Referring to FIGS. 3–5, apertures 120 are formed in the disk body of roller member 69 while similar apertures 122 are formed in the plane spur disks 62. The apertures 120 and 122 are formed at the same radial distance so that they may be axially aligned as indicated in FIG. 6 to allow insertion of an elongated connecting rod 124 through the apertures 120 and 122. The purpose of rod 124 is to permit simultaneous linked rotation of all rotary members 62, 69 when desired. Suitable headed fasteners 126 are connected to the outward ends of rod 124 to prevent inadvertent removal when the rod is in the position shown in FIG. 6.

In summary, the present implement is designed and constructed to cultivate or improve sod without eliminating large portions of the sod as is necessary with other methods such as plowing. The present implement digs up a portion of the stand of grass and leaves some loose soil in a narrowly dug track which forms a seed bed. At the same time, the remainder of the sod and mulch is left undisturbed in place and leveled so as to facilitate harvesting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A draft implement comprising a frame, a transverse horizontal shaft journaled to sides of said frame, two sets of spur disks of generally the same diameter concentrically mounted on said shaft with the disks said shaft, one set of disks being spaced between adjacent disks of the other set of disks, spacing means carried by said shaft to maintain said disks in axially spaced relation, one set of disks being mounted on said shaft for rotation therewith, the other set of disks being rotatably disposed on said shaft for independent rotation relative thereto, drive means connected to said shaft for rotating said shaft at a predetermined speed with said predetermined speed comprising an angular speed at least slightly less than the angular speed of said other set of disks as said implement is pulled over the ground with said other set of disks rollingly engaged with the ground.

2. The combination of claim 1 wherein said spacing means comprises cylindrical rings carried by and projecting outwardly of the opposite sides of said other set of disks concentric with the axis of rotation of said shaft, said disks being of axial extent to substantially span the axial spacing between adjacent disks of said sets of disks and said cylindrical rings being at least slightly smaller in diameter than said spur disks.

3. The combination of claim 2 wherein said disks of said one set of disks have registered apertures formed therethrough spaced radially outwardly from the center points of said one set of disks and the other set of disks have similar apertures formed therethrough registrable with the first-mentioned apertures, and an elongated rod removably securable through the registered apertures in said sets of disks for locking said other set of disks to said one set of disks for rotation therewith.

4. The combination of claim 2 wherein said spur disks include peripherally spaced radially outwardly projecting spurs of generally triangular shape when viewed from the side, the outside diameter of said rings being generally equal to the diameter of said disks exclusive of said spurs.

5. The structure of claim 1 together with wheel means movably mounted to the frame, and power means for moving the wheel means to an operative position whereby the frame, is raised thereby freeing the disk from further contact with the ground.

* * * * *